United States Patent
Suzuki et al.

(10) Patent No.: US 12,381,247 B2
(45) Date of Patent: Aug. 5, 2025

(54) SOLID OXIDE FUEL CELLS AND METHODS OF FORMING THEREOF

(71) Applicant: Proof Energy Inc., Fremont, CA (US)

(72) Inventors: Toshio Suzuki, Fremont, CA (US); Vlad Kalika, Ladera Ranch, CA (US)

(73) Assignee: Proof Energy Inc., Fremont, CA (US)

( * ) Notice: Subject to any disclaimer, the term of this patent is extended or adjusted under 35 U.S.C. 154(b) by 0 days.

(21) Appl. No.: 17/458,010

(22) Filed: Aug. 26, 2021

(65) Prior Publication Data

US 2023/0067972 A1    Mar. 2, 2023

(51) Int. Cl.
  *H01M 8/1213*  (2016.01)
  *H01M 4/86*  (2006.01)
  (Continued)

(52) U.S. Cl.
  CPC ....... *H01M 8/1213* (2013.01); *H01M 4/8621* (2013.01); *H01M 4/8885* (2013.01);
  (Continued)

(58) Field of Classification Search
  CPC ............. H01M 4/8621; H01M 4/8663; H01M 4/8885; H01M 4/9025; H01M 4/9033;
  (Continued)

(56) References Cited

U.S. PATENT DOCUMENTS

| | | | |
|---|---|---|---|
| 6,846,511 B2 | 1/2005 | Visco et al. | |
| 6,979,511 B2 | 12/2005 | Visco et al. | |

(Continued)

FOREIGN PATENT DOCUMENTS

| | | | |
|---|---|---|---|
| CN | 105888787 A | * | 8/2016 |
| JP | 2021036499 A | | 3/2021 |

(Continued)

OTHER PUBLICATIONS

Wang, Shaorong, et al. "Electrical and ionic conductivity of Gd-doped ceria." Journal of the Electrochemical Society 147.10 (2000): 3606 (Year: 2000).*

(Continued)

*Primary Examiner* — Matthew T Martin
*Assistant Examiner* — Jared Hansen
(74) *Attorney, Agent, or Firm* — Polygon IP, LLP

(57) ABSTRACT

Described herein are solid oxide fuel cells comprising conductive layers and methods of fabricating such cells. Specifically, a solid oxide fuel cell comprises cathode and anode layers, each comprising a porous base, catalyst sites disposed within the base, and a conductive layer. The conductive layer provides electrical conduction between the corresponding current collector and the catalyst sites. The conductive layer may at least partially extend into the porous base. For example, at least a portion of the conductive layer may be formed by infiltration of the porous base, e.g., before catalyst infiltration. In some examples, at least a portion of the conductive layer forms an interface between the corresponding porous base and the current collector. In these examples, the conductive layer is formed from an initial (green) conductive layer that is stacked between layers used to form the porous base and current collector and sintered the stack.

19 Claims, 12 Drawing Sheets

(51) Int. Cl.
*H01M 4/88* (2006.01)
*H01M 4/90* (2006.01)
*H01M 8/12* (2016.01)
*H01M 8/126* (2016.01)
*H01M 8/2428* (2016.01)

(52) U.S. Cl.
CPC ....... *H01M 4/9033* (2013.01); *H01M 4/9066* (2013.01); *H01M 8/126* (2013.01); *H01M 8/2428* (2016.02); *H01M 2008/1293* (2013.01)

(58) Field of Classification Search
CPC .. H01M 4/9066; H01M 8/126; H01M 8/1213; H01M 8/1226; H01M 8/2428; H01M 2008/1293; Y02E 60/50
See application file for complete search history.

(56) References Cited

U.S. PATENT DOCUMENTS

| | | | |
|---|---|---|---|
| 7,351,488 B2 | 4/2008 | Visco et al. | |
| 7,553,573 B2 | 6/2009 | Visco et al. | |
| 8,283,077 B1 | 10/2012 | Visco et al. | |
| 2002/0182468 A1* | 12/2002 | Janousek | C22C 38/28 429/465 |
| 2003/0068260 A1* | 4/2003 | Wellington | B01J 8/0285 422/600 |
| 2003/0068269 A1* | 4/2003 | Matzakos | B01J 8/0214 423/652 |
| 2003/0077504 A1* | 4/2003 | Hara | H01M 8/0247 429/456 |
| 2004/0185327 A1* | 9/2004 | Gorte | H01M 4/9033 429/535 |
| 2005/0221153 A1* | 10/2005 | Sugimoto | H01M 8/0232 429/495 |
| 2005/0255368 A1* | 11/2005 | Kaye | H01M 8/0432 429/432 |
| 2007/0269701 A1* | 11/2007 | Larsen | H01M 8/1226 429/496 |
| 2008/0193803 A1* | 8/2008 | Sholklapper | H01M 4/8652 427/230 |
| 2009/0061279 A1* | 3/2009 | Larsen | H01M 4/9033 429/410 |
| 2009/0061284 A1* | 3/2009 | Blennow | C04B 35/50 429/466 |
| 2009/0068533 A1 | 3/2009 | Fukasawa et al. | |
| 2010/0143824 A1 | 6/2010 | Tucker et al. | |
| 2011/0053041 A1* | 3/2011 | Tucker | C22C 30/02 75/232 |
| 2013/0216925 A1* | 8/2013 | Liu | H01M 4/9025 429/468 |
| 2016/0096151 A1* | 4/2016 | Serra | C01B 3/505 422/187 |
| 2018/0323443 A1 | 11/2018 | Tucker et al. | |
| 2020/0144645 A1* | 5/2020 | Li | H01M 4/8605 |
| 2020/0358122 A1 | 11/2020 | Tucker et al. | |
| 2022/0145480 A1* | 5/2022 | Tucker | H01M 4/8803 |

FOREIGN PATENT DOCUMENTS

| | | |
|---|---|---|
| KR | 20200099354 A | 8/2020 |
| WO | 9849738 A1 | 11/1998 |
| WO | WO-2014145103 A1 * | 9/2014 .......... H01M 4/8621 |

OTHER PUBLICATIONS

CN105888787A, Lu, et al., "Device for automobile exhaust treatment and preparation method thereof", machine English translation retrieved from https://worldwide.espacenet.com/ Date: Nov. 30, 2023 (Year: 2016).*

Qiu, Peng, et al. "LaCrO3-Coated La0. 6Sr0. 4Co0. 2Fe0. 8O3- σ core-shell structured cathode with enhanced Cr tolerance for intermediate-temperature solid oxide fuel cells." ACS applied materials & interfaces 12.26 (2020): 29133-29142 (Year: 2020).*

Dogdibegovic, Emir, et al. "High performance metal-supported solid oxide fuel cells with infiltrated electrodes." Journal of Power Sources 410 (2019): 91-98 (Year: 2019).*

International Application No. PCT/US22/75258, Search Report and Written Opinion mailed Dec, 2, 2022.

* cited by examiner

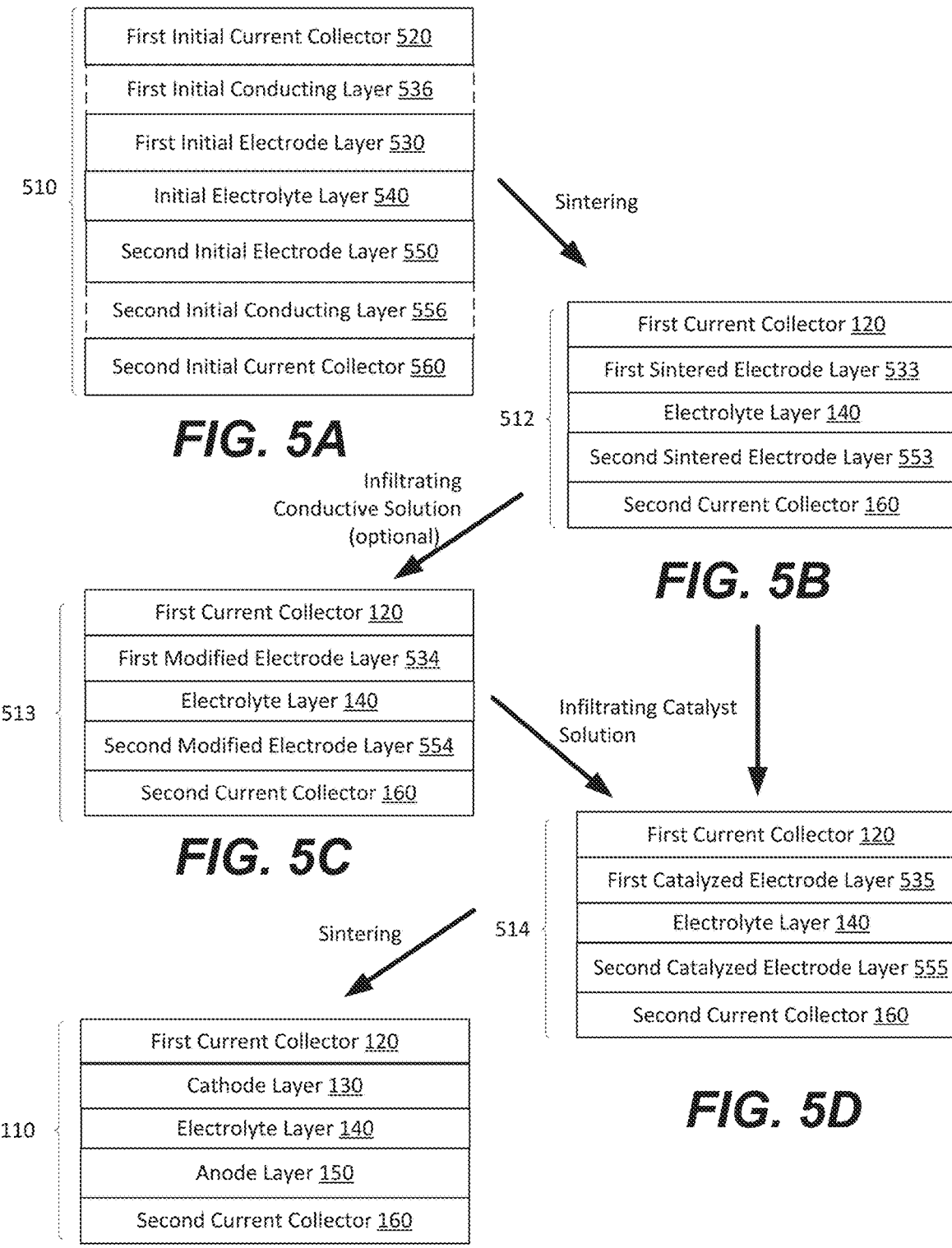

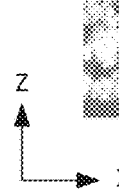
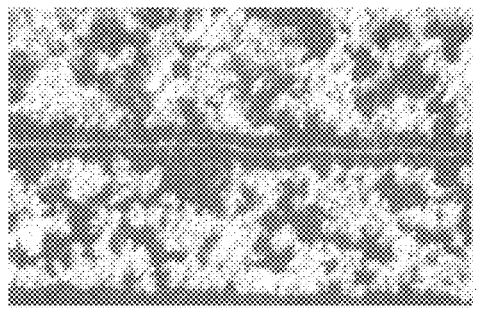
FIG. 7A
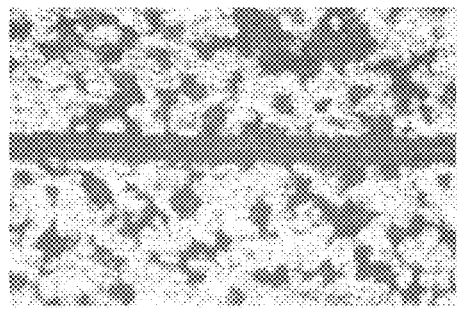
FIG. 7C
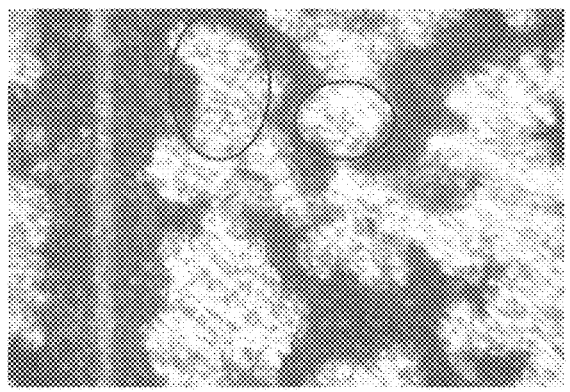
FIG. 7B
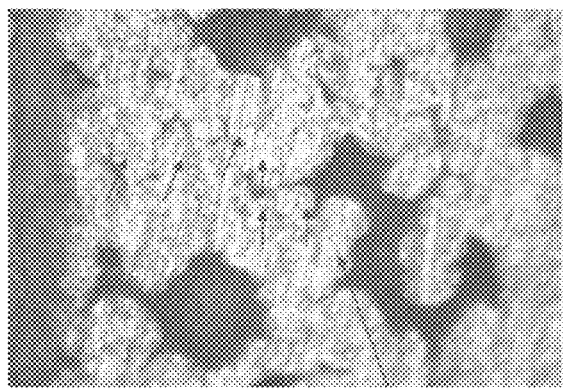
FIG. 7D

SOLID OXIDE FUEL CELLS AND METHODS OF FORMING THEREOF

BACKGROUND

Solid oxide fuel cells are used for various applications, e.g., auxiliary power units in vehicles, stationary power generators, and the like. Similar to other fuel cells and unlike conventional heat engines, solid oxide fuel cells are modular, scalable, efficient, and clean. For example, solid oxide fuel cells have lower emissions than heat engines. Furthermore, solid oxide fuel cells can use a wide range of fuels and are generally more tolerant to fuel contaminants than other types of fuel cells. Solid oxide fuel cells also produce high-temperature exhaust that can be used, for example, to power heaters and turbines. Finally, solid oxide fuel cells can provide carbon capture opportunities due to the separation of fuel and oxidant streams in these cells.

Solid oxide fuel cells utilize ceramic oxides for their electrolyte layer. An electrolyte layer is responsible for conducting oxide ions, protons, and/or other ions between the electrodes (i.e., cathodes and anodes). This ionic transfer can be performed at a crystal lattice level. The fuel cell electrodes can be also formed from ceramic oxides and infiltrated with catalysts, forming catalysts sites within these oxide structures. The catalyst enables electrochemical decomposition and oxidation reactions within the cell These electrochemical reactions produce an electrical current, which is transmitted by the current collectors coupled to the electrodes. However, the catalyst sites provide limited electronic conduction, which limits the performance of the solid oxide fuel cells, such as power density.

What is needed are new solid oxide fuel cells with improved electronic and ionic conduction within the electrodes (cathodes and anodes) and also between the electrode and the current collectors.

SUMMARY

Described herein are solid oxide fuel cells comprising conductive layers and methods of fabricating such cells. Specifically, a solid oxide fuel cell comprises cathode and anode layers, each comprising a porous base, catalyst sites disposed within the base, and a conductive layer. The conductive layer provides electronic and ionic conduction between the corresponding current collector and the catalyst sites. The conductive layer may at least partially extend into the porous base. For example, at least a portion of the conductive layer may be formed by infiltration of the porous base, e.g., before catalyst infiltration. In some examples, at least a portion of the conductive layer forms an interface between the corresponding porous base and the current collector. In these examples, the conductive layer is formed from an initial (green) conductive layer that is stacked between layers used to form the porous base and current collector and sintered the stack.

In some examples, a solid oxide fuel cell comprises a first current collector, a second current collector, an electrolyte layer, a cathode layer, and an anode layer. The cathode layer comprises a cathode porous base, cathode catalyst sites, and a cathode conductive layer. The cathode layer is disposed between and in contact with the first current collector and the electrolyte layer. The cathode conductive layer provides electrical conduction between the first current collector and the cathode catalyst sites. The anode layer comprises an anode porous base, anode catalyst sites, and an anode conductive layer. The anode layer is disposed between and in contact with the second current collector and the electrolyte layer. The anode conductive layer provides electrical conduction between the second current collector and the anode catalyst sites.

In some examples, the anode porous base comprises an internal anode porous base surface. The anode conductive layer is disposed on the internal anode porous base surface and defines anode pores of the anode layer. The anode catalyst sites are disposed over the anode conductive layer.

In some examples, the anode conductive layer extends to and contacts the second current collector. In more specific examples, the internal anode porous base surface contacts the second current collector.

In some examples, the anode conductive layer comprises a first anode conductive layer portion and a second anode conductive layer portion. The first anode conductive layer portion is disposed between and contacts the anode porous base and the second current collector such that the anode porous base is spaced away from the second current collector. The second anode conductive layer portion is disposed on the internal anode porous base surface and defines the anode pores of the anode layer.

In some examples, the cathode porous base comprises an internal cathode porous base surface. The cathode conductive layer is disposed on the internal cathode porous base surface and defines cathode pores of the cathode layer. The cathode catalyst sites are disposed over the cathode conductive layer.

In some examples, the anode conductive layer is disposed between and contacts the anode porous base and the second current collector such that the anode porous base is spaced away from the second current collector. In more specific examples, the cathode conductive layer is disposed between and contacts the cathode porous base and the first current collector such that the cathode porous base is spaced away from the first current collector. The anode conductive layer may have a thickness of 1 micrometer to 20 micrometers. Furthermore, in some examples, the anode conductive layer comprises cerium dioxide ($CeO_2$) doped with one or more samarium (Sm), gadolinium (Gd), lanthanum (La), calcium (Ca), yttrium (Y), and/or zirconium (Zr).

In some examples, at least one of the first current collector or the second current collector comprises a sintering-control agent, selected from the group consisting of doped zirconia ($X-ZrO_2$ with X representing one or more of yttrium (Y), scandium (Sc), cerium (Ce), calcium (Ca)), alumina ($Al_2O_3$), yttria ($Y_2O_3$), calcium oxide (CaO), and magnesium oxide (MgO).

In some examples, a method of forming a solid oxide fuel cell comprises forming an initial unit cell comprising a first initial current collector, a first initial electrode layer, an initial electrolyte layer, a second initial electrode layer, and a second current collector. The method further comprises sintering the initial unit cell thereby forming a pre-catalyzed unit cell and infiltrating a cathode catalyst solution and an anode catalyst solution into the pre-catalyzed unit cell thereby forming a catalyst-infiltrated unit cell. The method also comprises sintering the catalyst-infiltrated unit cell thereby forming a unit cell of the solid oxide fuel cell comprising a first current collector, a cathode layer, an electrolyte layer, an anode layer, and a second current collector. In some examples, the cathode layer comprises a cathode porous base formed from the first initial electrode layer, cathode catalyst sites formed from the cathode catalyst solution, and a cathode conductive layer. The cathode conductive layer provides electrical conduction between the first current collector and the cathode catalyst sites. The anode layer comprises an anode porous base formed from the second initial electrode layer, anode catalyst sites formed from the anode catalyst solution, and an anode conductive layer. The anode conductive layer provides electrical conduction between the second current collector and the anode catalyst sites.

In some examples, the initial unit cell further comprises a first initial conducting layer, disposed between the first initial current collector and the first initial electrode layer, and a second initial conducting layer, disposed between the second initial current collector and the second initial electrode layer. In these examples, sintering the initial unit cell converts the first initial conducting layer into the cathode conductive layer and further converts the second initial conducting layer into the anode conductive layer. In more specific examples, at least one of the first initial conducting layer or the second initial conducting layer comprises discrete particles that are converted into a porous structure while sintering the initial unit cell. For example, the discrete particles comprise at least one of cerium dioxide ($CeO_2$), lanthanum chromite ($LaCrO_3$), strontium titanate ($SrTiO_3$), 430 stainless steel alloy, 434 stainless steel alloy, and a Fe—Cr alloy. These discrete particles may be doped with one or more strontium (Sr), aluminum (Al), cobalt (Co), samarium (Sm), gadolinium (Gd), lanthanum (La), calcium (Ca), yttrium (Y), and/or zirconium (Zr). In some examples, the discrete particles have a size of 1 nanometer to 1 micrometer.

In some examples, at least one of the first initial conducting layer or the second initial conducting layer has a thickness from 1 micrometer to 30 micrometers. In the same or other examples, at least one of the first initial conducting layer or the second initial conducting layer comprises a pore former in an amount of up 10% by weight.

In some examples, the method further comprises, before infiltrating the cathode catalyst solution and the anode catalyst solution, infiltrating a conductive solution into the pre-catalyzed unit cell. Sintering the catalyst-infiltrated unit cell converts the conductive solution into at least a portion of the cathode conductive layer and a portion of the anode conductive layer. In some examples, the conductive solution comprises cerium dioxide ($CeO_2$) and one or more samarium (Sm), gadolinium (Gd), lanthanum (La), calcium (Ca), yttrium (Y), and/or zirconium (Zr).

These and other embodiments are described further below with reference to the figures.

BRIEF DESCRIPTION OF THE DRAWINGS

FIGS. 5A-5E are schematic illustrations of different stages while forming solid oxide fuel cells.

FIGS. 7A and 7B are SEM images of a unit cell formed without a sintering-control additive.

FIGS. 7C and 7D are SEM images of a unit cell formed with a sintering-control additive.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

As noted above, solid oxide fuel cells utilize ceramic oxides for their electrolyte layers and electrodes in some cell designs. For example, porous ceramic structures or, more specifically, porous ceramic layers can be used as cathode and anode bases. These porous bases are impregnated anode and cathode active catalysts. More specifically, these porous bases receive and provide support to respective catalyst sites. The porosity of these structures allows fuel and oxidants to reach the catalysts sites and complete electrochemical decomposition and oxidation reactions thereby producing an electrical current. Furthermore, the porosity of these structures allows reaction products to leave the fuel cell.

However, in these cell designs, ceramic oxides and even catalysts sites can provide poor electronic conduction, limiting the electrical current transmission between the reaction sites and current collectors. For example, the electronic conductivity of yttria-stabilized zirconia (YSZ) is almost negligible (e.g., less than 0.1%) in comparison to that of the catalyst. While catalyst sites can be formed from electrically conductive materials, these sites are small and have limited physical contact among individual sites. For example, the catalyst site size can be from 10 nanometers to 300 nanometers. Therefore, the electronic conduction path provided by the catalysts sites is also limited. Minimal electronic conduction paths are provided primarily through occasional contacts of small catalyst sites.

Figure 6A:
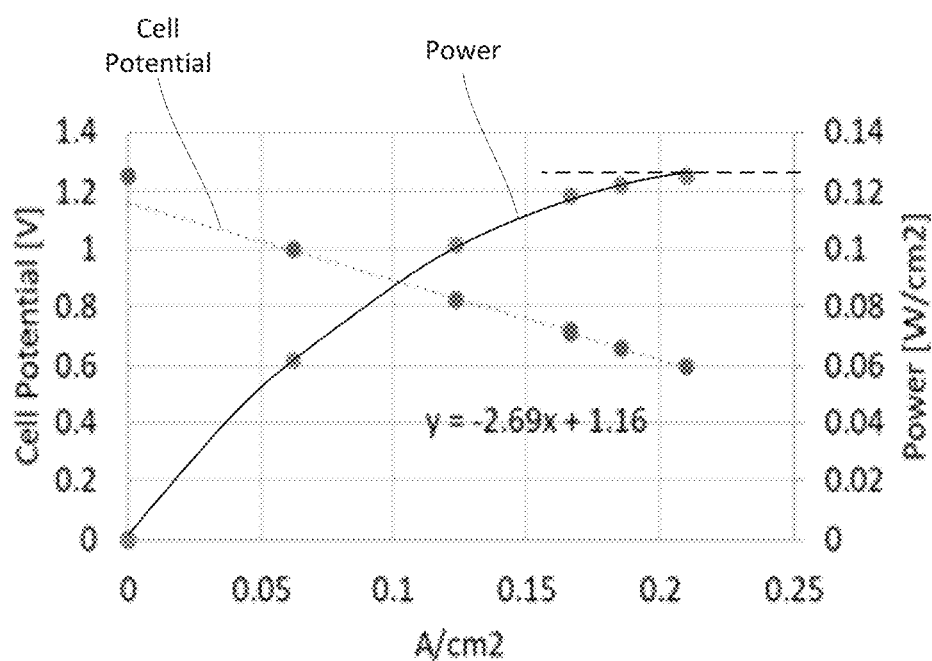
FIG. 6A is a plot of the cell potential and power as a function of the cell current in a reference cell formed with no conducting layers.
Figure 6B:
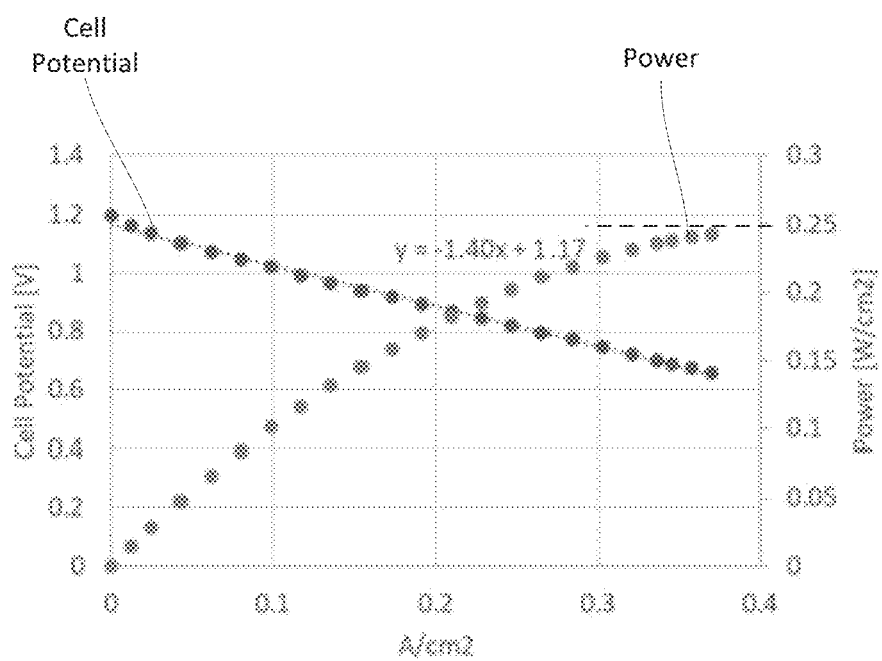
FIG. 6B is a plot of the cell potential and power as a function of the cell current in a test cell formed with conducting layers.

The addition of cathode conductive layers and/or anode conductive layers greatly improves the electronic and ionic conduction within solid oxide fuel cells, specifically between the catalyst sites and the current collectors. Experimental results, presented in FIGS. 6A and 6B, show a double increase of the power when the conductive layers were added to the anode and cathode. In some examples, these conductive layers are formed from cerium dioxide ($CeO_2$), lanthanum chromite ($LaCrO_3$), strontium titanate ($SrTiO_3$), 430 stainless steel alloy, 434 stainless steel alloy, and/or a Fe—Cr alloy. In more specific examples, these conductive layers are also doped with one or more strontium (Sr), aluminum (Al), cobalt (Co), samarium (Sm), gadolinium (Gd), lanthanum (La), calcium (Ca), yttrium (Y), and/or zirconium (Zr). In addition to the material properties (e.g., electronic conductivity), the conductive layer can have a specific thickness, continuity, and position with each electrode to ensure the electronic and ionic conduction within the overall fuel cell. For example, at least a portion of the conductive layer can protrude into a corresponding electrode base, e.g., formed by infiltration of this base. In the same or other examples, the conductive layer (partially or entirely) can form an interface between the electrode base and the corresponding current collector. In these examples, at least a portion of the conductive layer can be formed by sintering. Finally, conductive layers can prevent interactions between catalysts sites and ceramic bases and also between ceramic bases and current collectors.

Examples of Solid Oxide Fuel Cells

Figure 1A:
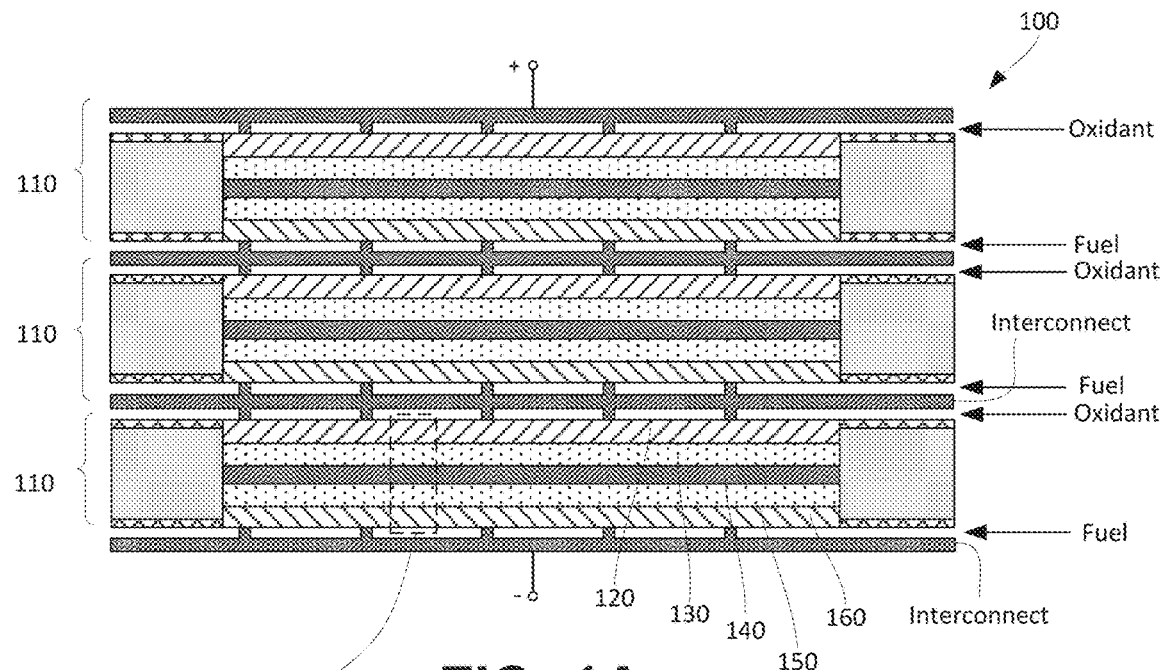
FIG. 1A is a schematic representation of a fuel cell formed by stacking multiple unit cells, in accordance with some examples.

FIG. 1A is a schematic representation of solid oxide fuel cell 100 formed by stacking multiple unit cells 110, in accordance with some examples. While FIG. 1A illustrates three unit cells 110 stacked together, one having ordinary skill in the art would understand that any number of unit cells 110 can be stacked in a similar manner. The number of unit cells 110 determines the overall power and voltage of solid oxide fuel cell 100. Furthermore, while FIG. 1A illustrates a planar configuration of multiple unit cells 110, one having ordinary skill in the art would understand that a tubular configuration and other configurations of solid oxide fuel cell 100 are also within the scope.

Referring to FIG. 1A, each unit cell 110 comprises two current collectors, such as first current collector 120 and second current collector 160. Unit cell 110 also comprises cathode layer 130, electrolyte layer 140, and anode layer 150. Electrolyte layer 140 is disposed between cathode layer 130 and anode layer 150 and provides ionic conduction between cathode layer 130 and anode layer 150. In some examples, electrolyte layer 140 directly interfaces one or both between cathode layer 130 and anode layer 150. Cathode layer 130 and anode layer 150 are electronically and ionically coupled to first current collector 120 and second current collector 160, respectively. For example, cathode layer 130 can directly interface first current collector 120. In the same or other examples, anode layer 150 can directly interface second current collector 160.

Two adjacent unit cells 110 can be connected by an interconnect structure. For example, the same interconnect structure can be electrically coupled to first current collector 120 of one unit cell 110 and second current collector 160 of another unit cell 110, thereby providing an in-series connection of these unit cells 110. In some examples, an interconnect structure also forms passageways for supplying and fuel and oxidant to unit cells 110. For example, the oxidant is flown toward first current collector 120 of each unit cell 110. First current collector 120 is specially configured to pass the oxidant to the corresponding cathode layer 130 where the oxidant reacts. Similarly, the fuel is flown toward second current collector 160 of each unit cell 110. Second current collector 160 is specially configured to pass the fuel to the corresponding anode layer 150 where the fuel reacts.

Figure 1B:
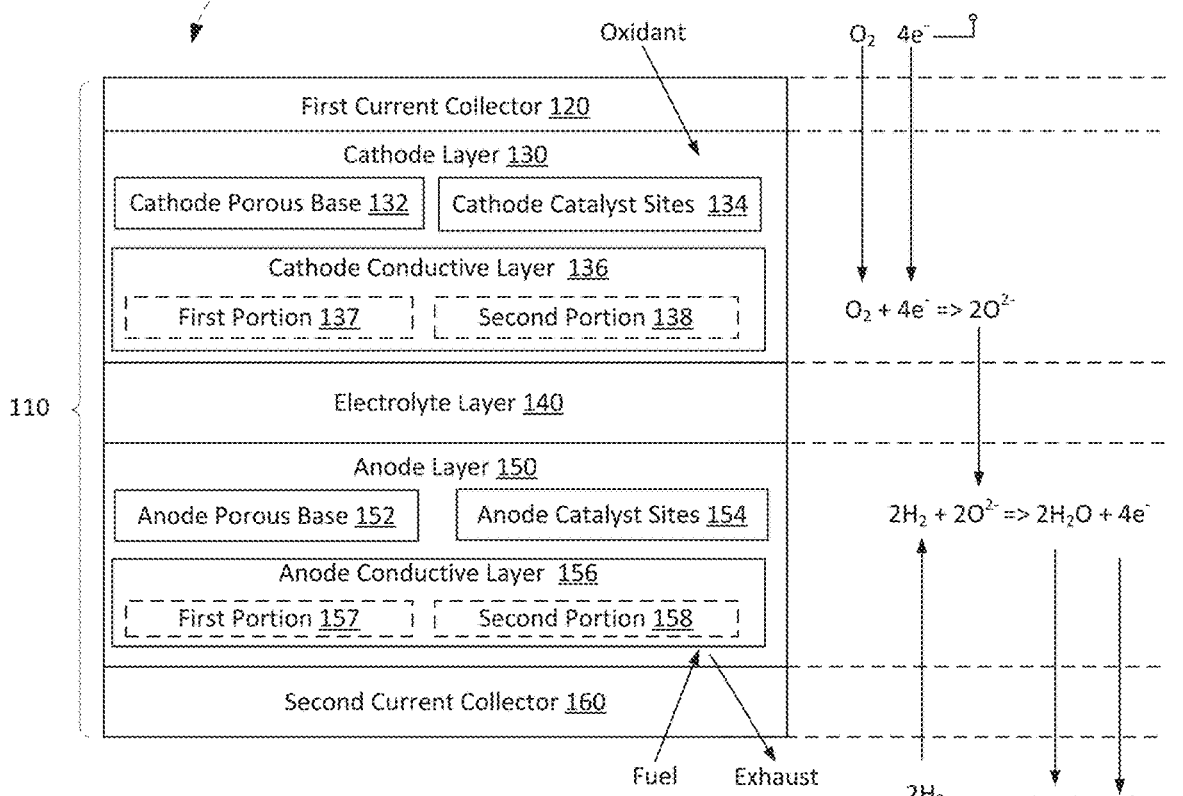
FIG. 1B is a schematic block diagram of one unit cell in FIG. 1A, in accordance with some examples.

FIG. 1B is a schematic block diagram of unit cell 110, which is a part of solid oxide fuel cell 100, in accordance with some examples. Each component of unit cell 110 will now be described in more detail with reference to FIG. 1B. As schematically shown, cathode layer 130 comprises cathode porous base 132, cathode catalyst sites 134, and cathode conductive layer 136. Cathode conductive layer 136 provides electronic conduction between first current collector 120 and cathode catalyst sites 134. Similarly, anode layer 150 comprises anode porous base 152, anode catalyst sites 154, and anode conductive layer 156. Anode conductive layer 156 provides electronic conduction between second current collector 160 and anode catalyst sites 154. Cathode conductive layer 136 and anode conductive layer 156 differentiate unit cell 110 and solid oxide fuel cells 100 from conventional fuel cells, in which electronic conduction can be limited.

In some examples, one or both first current collector 120 and second current collector 160 comprise stainless steel, such 430 stainless steel alloy, 434 stainless steel alloy, Fe—Cr alloys (e.g., with various additives), and the like. In some examples, the thickness of one or both first current collector 120 and second current collector 160 is from 30 micrometers to 500 micrometers or, more specifically, from 50 micrometers to 400 micrometers. While a thicker current collector can help to support a larger current density (the current per unit area of the fuel cell), the transport of fuel and oxygen is more difficult through thicker structures. The porosity of one or both first current collector 120 and second current collector 160 can be between 20% and 60% or, more specifically, between 30 and 55%. The electronic conduction and the material transfer are both impacted by the current collector porosity. In some examples, one or both first current collector 120 and second current collector 160 comprise a sintering-control agent, such as doped zirconia ($X—ZrO_2$, wherein X can be yttrium (Y), scandium (Sc), cerium (Ce), and/or calcium (Ca)), alumina ($Al_2O_3$), yttria ($Y_2O_3$), calcium oxide (CaO), magnesium oxide (MgO). The amount of sintering-control agent can be between 0.1% by weight and 5% by weight or, more specifically, between 0.5% by weight and 2.5% by weight. The sintering-control agent helps to achieve finer metal grains, smaller pores, more uniform pore distribution, higher porosity. Overall, adding the sintering-control agent helps achieve higher flow rates of fuel, oxidant, and reaction products through the current collectors.

In some examples, first current collector 120 and/or second current collector 160 are configured to conduct the fuel or oxygen to the electrode layers of unit solid oxide fuel cell 110. Referring to an example in the left portion of FIG. 1B, an oxidant (e.g., oxygen) can flow through first current collector 120 to cathode layer 130, which is positioned adjacent to first current collector 120. The oxidant forms oxidant ions within cathode layer 130 when electrons are received from first current collector 120. These oxidant ions are then transported through electrolyte layer 140 (e.g., via lattice transport) from cathode layer 130 to anode layer 150, where these ions react with the fuel (e.g., hydrogen) and release electrons. These released electrons are transported to second current collector 160. Second current collector 160 is also configured to transport the fuel to anode layer 150 and exhaust (the reaction product of the fuel and the oxidant ions) from anode layer 150.

In some examples, cathode porous base 132 comprises yttria-stabilized zirconia (YSZ), which is a ceramic comprising zirconium dioxide ($ZrO_2$) and yttrium oxide ($Y_2O_3$). Yttrium oxide helps to maintain zirconium dioxide in a cubic crystal structure over a wide temperature range. Other suitable additives in zirconia include, but are not limited to, scandium (Sc), ceria ($CeO_2$), and/or calcium. Other suitable materials for cathode porous base 132 include, but are not limited to, ceria ($CeO_2$) dopes with gadolinium (Gd), samarium (Sm), lanthanum (La), calcium (La), and yttrium (Y). In some examples, the thickness of cathode porous base 132 is anywhere from 5 micrometers to 40 micrometers or, more specifically, from 10 micrometers to 30 micrometers. The porosity of cathode porous base 132 can be between 20% and 60% or, more specifically, between 30% and 50%. The pore size can be between 0.1 micrometers and 25 micrometers or, more specifically, between 0.5 micrometers and 20 micrometers. In some examples, anode porous base 152 has the same structure (e.g., the composition, thickness, and porosity as cathode porous base 132.

In some examples, cathode catalyst sites 134 comprise, but are not limited to, lanthanum strontium manganite (LSM with a general formula or $La_{1-x}Sr_xMnO_3$), praseodymium oxide (e.g., $Pr_2O_3$, $PrO_2$, $Pr_6O_{11}$), lanthanum strontium cobalt ferrite (LSCF with a general formula $La_xSr_{1-x}Co_yFe_{1-y}O_3$), and/or lanthanum strontium cobaltite (LSC, e.g., $LaSrCoO_3$). The material of cathode catalyst sites 134 is specifically selected to provide oxygen reduction. Furthermore, cathode catalyst sites 134 are at least partially responsible for the electronic conduction to first current collector 120. For example, LSM has a high electrical conductivity at higher temperatures (e.g., between about 100 S/cm and 500 S/cm at a temperature of 600° C. and 1000° C.). Furthermore, LSM does not react with YSZ, which helps with extending the operating lifetime of solid oxide fuel cell 100. However, the ionic conductivity of LSM is low, which limits the activity of cathode catalyst sites 134 (e.g., to a triple-phase boundary). In some examples, a combination of LSM and YSZ is used as cathode catalyst sites 134 to increase the size of this triple-phase boundary. It should be noted that cathode catalyst sites 134 are designed to be small structures and uniformly spread within cathode porous base 132 resulting in limited electron conduction paths among cathode catalyst sites 134 and also between cathode catalyst sites 134 and first current collector 120. These limited electron conduction paths limit the performance of conventional fuel cells as shown demonstrated below with reference to FIGS. 6A and 6B. In some examples, the size of cathode catalyst sites 134 is between 10 nanometers and 200 nanometers or, more specifically, between 20 nanometers and 100 nanometers. With that size and even distribution, the electron conduction is limited.

In some examples, cathode conductive layer 136 is provided within cathode layer 130 to provide the electronic conduction between first current collector 120 and cathode catalyst sites 134 and also among cathode catalyst sites 134. Cathode conductive layer 136 can comprise cerium dioxide ($CeO_2$), which may be also referred to as ceria. Ceria is capable of withstanding reducing environments and high temperatures and can be operable as a barrier layer and protect cathode porous base 132 from interacting with cathode catalyst sites 134 (e.g., reacting, forming new oxides). As such, the performance of cathode catalyst sites 134 is greatly extended when cathode conductive layer 136 is added. Ceria in cathode conductive layer 136, operable at least in part as a barrier layer, is particularly useful for cathode catalyst sites 134 formed from LSCF and/or LSC.

In some examples, cathode conductive layer 136 also comprises one or more dopants selected from samarium (Sm), gadolinium (Gd), lanthanum (La), calcium (Ca), yttrium (Y), and/or zirconium (Zr). These dopant materials provide good ionic conduction. These dopants are also used to improve the conductivity of cathode conductive layer 136. In some examples, the concentration of these dopants in cathode conductive layer 136 is between 5 molar % and 30 molar % or, more specifically, between 10 molar % and 20 molar %.

In some examples, cathode conductive layer 136 is formed from lanthanum chromite ($LaCrO_3$), strontium titanate ($SrTiO_3$), 430 stainless steel alloy, 434 stainless steel alloy, Fe—Cr alloy, and/or doped versions thereof. The composition and other properties of cathode conductive layer 136 depend at least in part on the position of cathode conductive layer 136 within cathode layer 130.

Figure 3A:
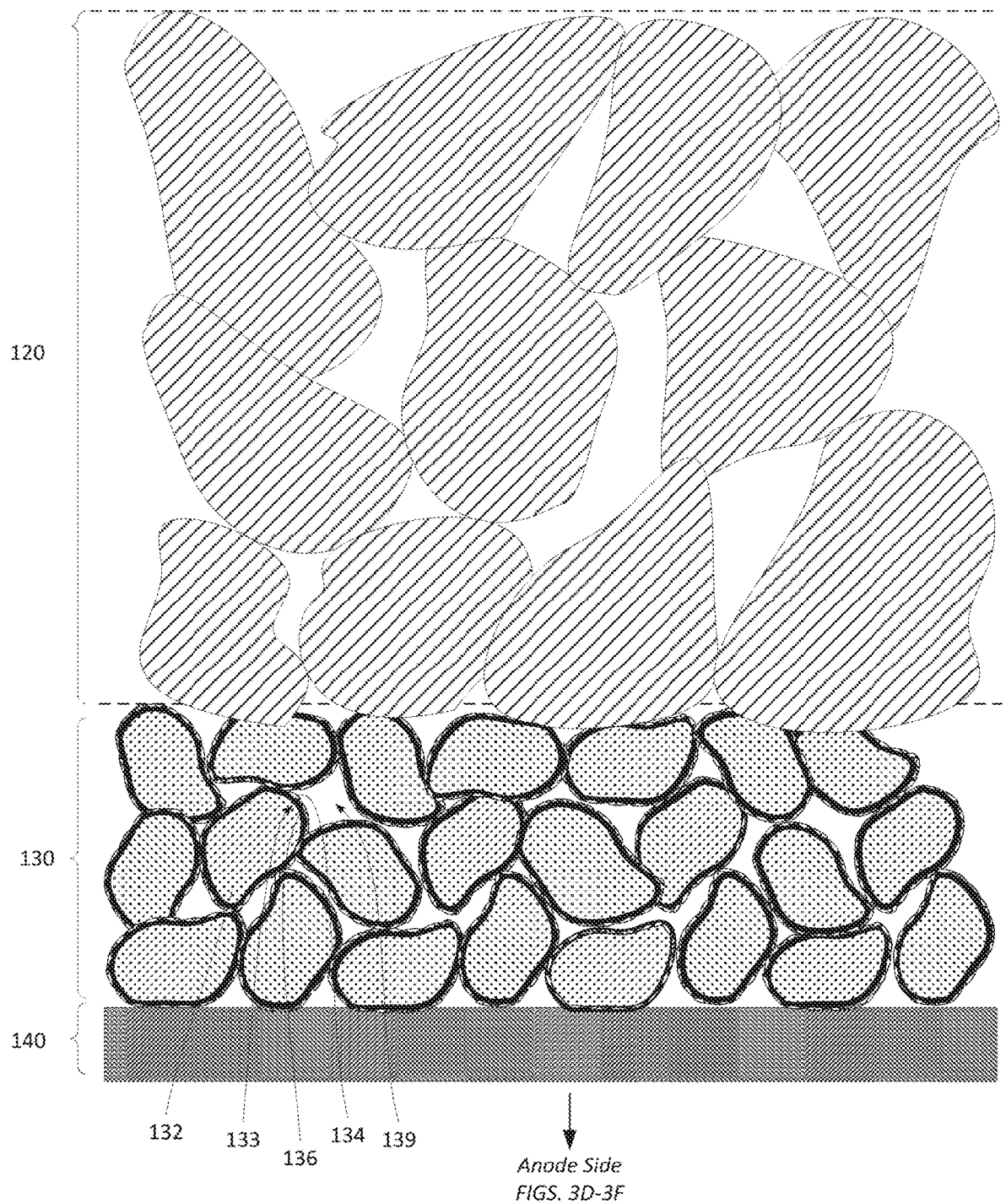
FIG. 3A is a schematic representation of the cathode side of a unit cell, illustrating electronic pathways within the cathode layer provided, at least in part by a cathode conductive layer.
Figure 3B:
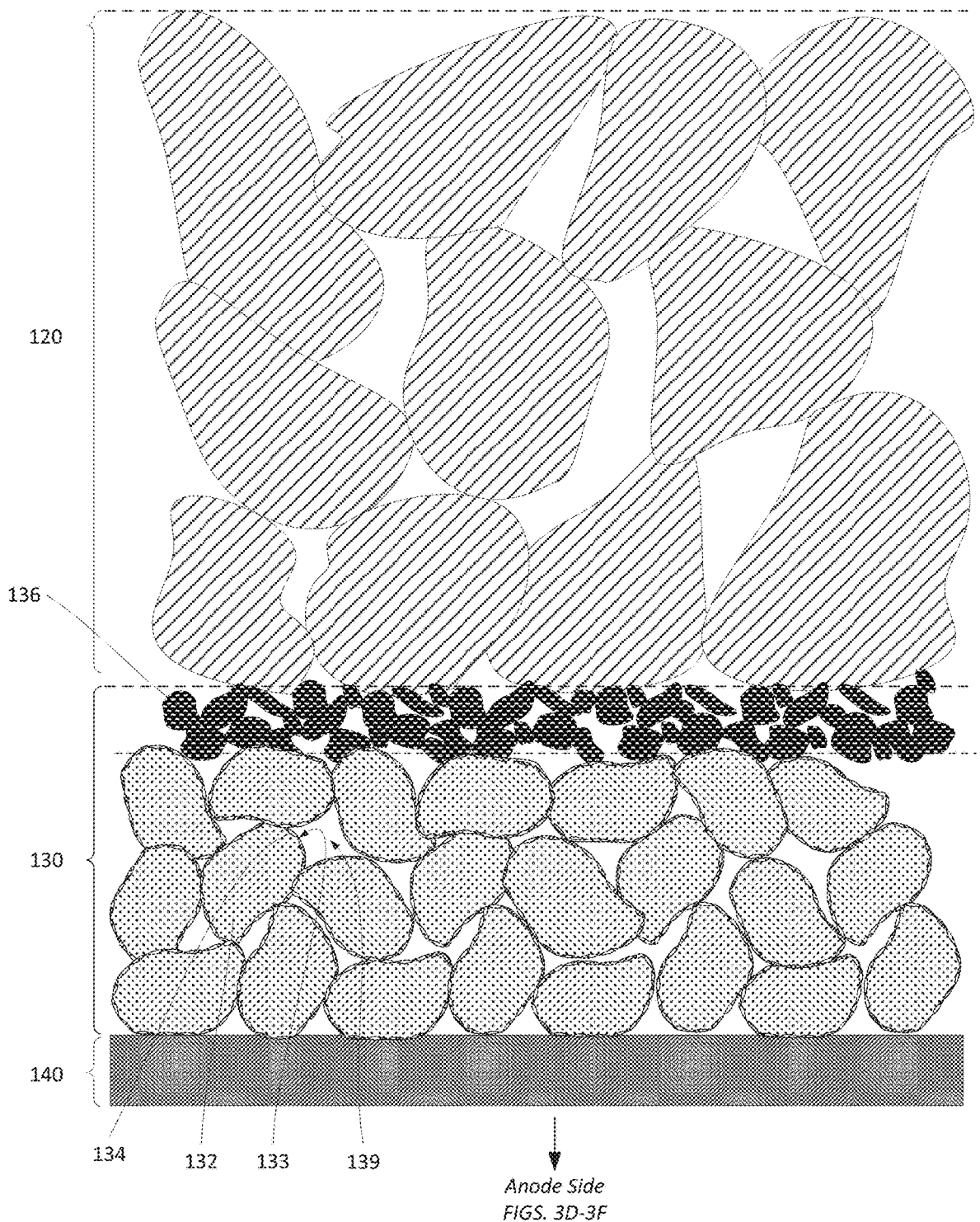
FIG. 3B is a schematic representation of the cathode side of a unit cell, illustrating electronic pathways between the cathode layer and the current collector provided, at least in part by a cathode conductive layer.
Figure 3C:
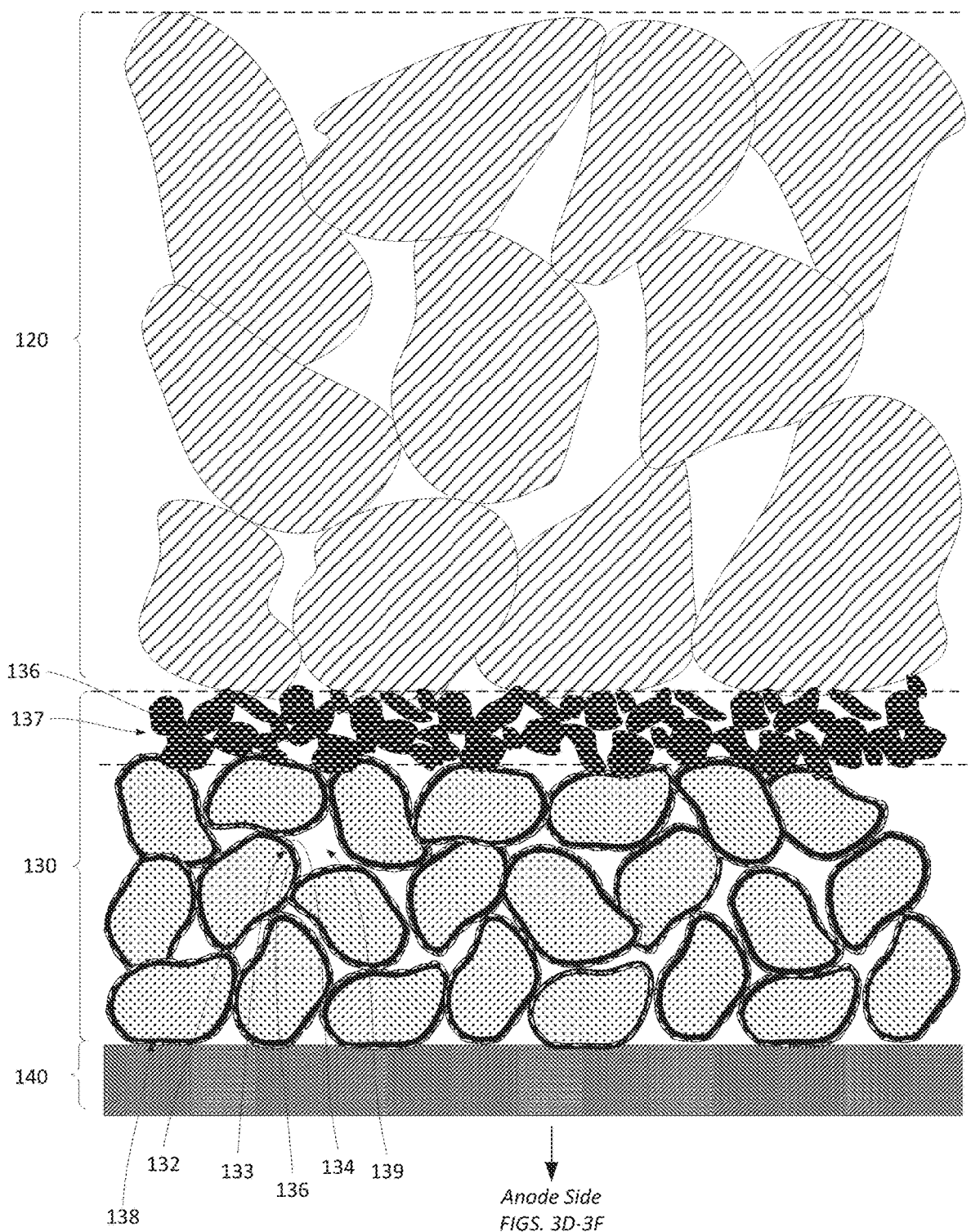
FIG. 3C is a schematic representation of the cathode side of a unit cell, illustrating electronic pathways within the cathode layer and between the cathode layer and the current collector provided, at least in part by a cathode conductive layer.

Cathode conductive layer 136 can be positioned within cathode layer 130 in several ways, as further described below with reference to FIGS. 3A-3C. For example, cathode conductive layer 136 can be provided as a surface layer within cathode porous base 132 (e.g., as shown in FIG. 3A), as a separate layer positioned between first current collector 120 and cathode porous base 132 (e.g., as shown in FIG. 3B), or as a combination of the previous two examples (e.g., as shown in FIG. 3C). In some examples, anode conductive layer 156 has the same structure (e.g., the composition, thickness, and porosity as cathode conductive layer 136.

Figure 2A:
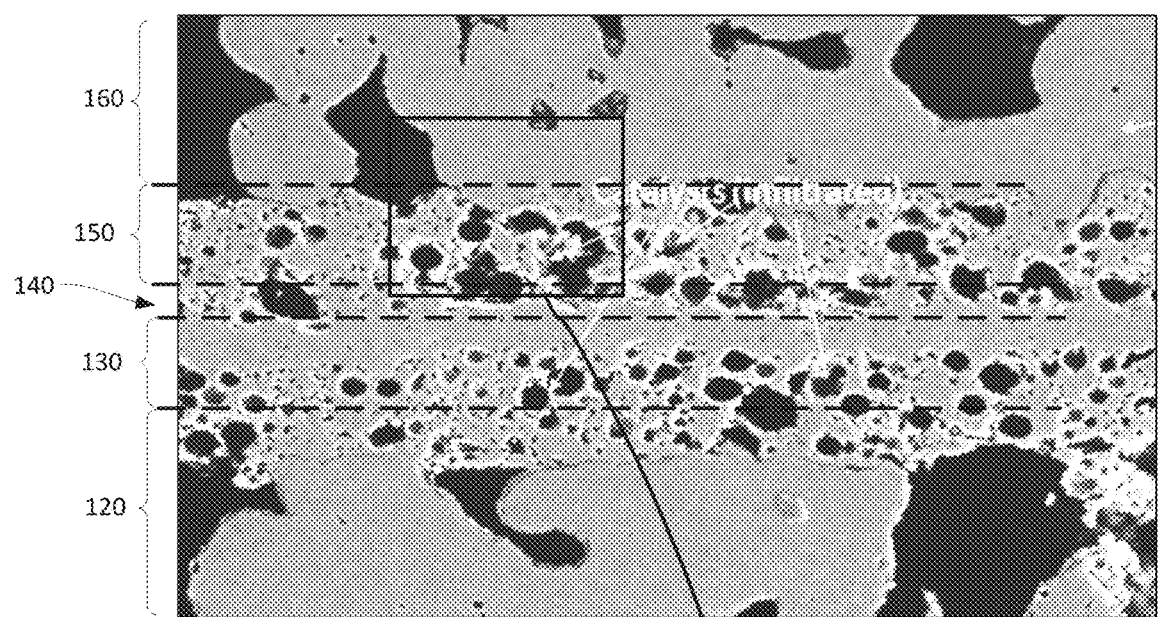
FIG. 2A is a scanning electron microscope (SEM) image of a unit cell identifying current collectors, electrode layers, and electrolyte layers.
Figure 2B:
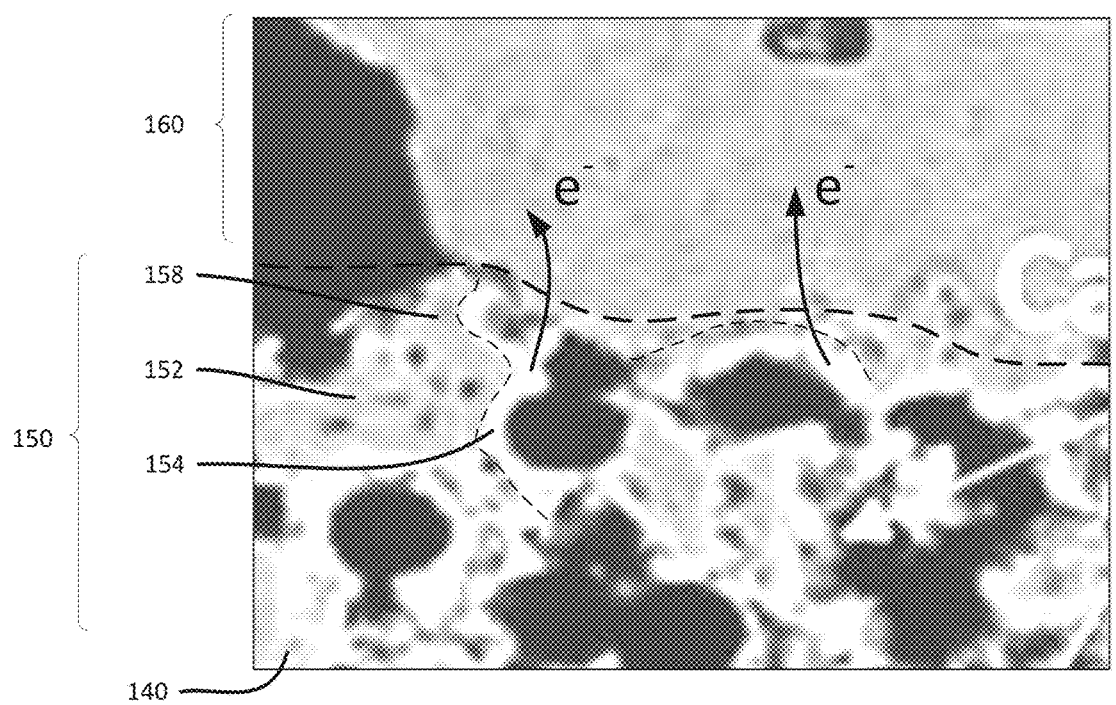
FIG. 2B is a magnified portion of the SEM image in FIG. 2A, which better illustrates one of the current collector, anode base, and multiple anode catalyst sites positioned within the pores of the anode base.

In some examples, anode catalyst sites 154 comprise nickel. The material of anode catalyst sites 154 is specifically selected to stimulate electrochemical fuel oxidation. Furthermore, anode catalyst sites 154 are at least partially responsible for the electronic conduction to second current collector 160 as will now be described with reference to FIGS. 2A and 2B. Specifically, FIG. 2A is a scanning electron microscope (SEM) image of a unit cell cross-section. First current collector 120, cathode layer 130, electrolyte layer 140, anode layer 150, and second current collector 160 are specifically identified in FIG. 2A. FIG. 2B is a magnified portion of the SEM image in FIG. 2A, focusing on anode layer 150, disposed between electrolyte layer 140 and second current collector 160. Anode layer 150 comprises anode porous base 152, which has anode pores 159 (the darkest areas). Anode catalyst sites 154 (the lightest areas) are positioned within anode pores 159. The oxygen reduction takes place on anode catalyst sites 154 causing the release of electrons. These electrons travel to second current collector 160 through anode catalyst sites 154 as anode porous base 152 is not sufficiently conductive. However, the clustered nature of anode catalyst sites 154, as well as the small size (e.g., footprints and thickness) of individual anode catalyst sites 154, interfere with this electron travel. The addition of anode conductive layer 156 (not shown in FIGS. 2A and 2B) assists with this electron transfer as well as with this ion transfer as described above. Cathode conductive layer 136 provides similar assistance to electronic and ionic transport within cathode layer 130.

FIG. 3A is a schematic representation of the cathode cell side, in accordance with some examples. Specifically, FIG. 3A illustrates first current collector 120, electrolyte layer 140, and cathode layer 130 disposed between first current collector 120 and electrolyte layer 140. As noted above, cathode layer 130 comprises cathode porous base 132, cathode catalyst sites 134, and cathode conductive layer 136. Cathode porous base 132 comprises internal cathode porous base surface 133. Referring to the example in FIG. 3A, cathode conductive layer 136 (shown as a thick black line) is disposed on internal cathode porous base surface 133. In some examples, cathode conductive layer 136 defines cathode pores 139 of cathode layer 130. Cathode catalyst sites 134 are disposed over cathode conductive layer 136, e.g., within cathode pores 139. In other words, cathode conductive layer 136 at least partially separates cathode porous base 132 from cathode catalyst sites 134. In some examples, cathode conductive layer 136 fully separates cathode porous base 132 from cathode catalyst sites 134. This separation helps to prevent interaction between cathode porous base 132 and cathode catalyst sites 134, which may otherwise negatively impact the performance of cathode catalyst sites 134. Furthermore, cathode conductive layer 136 provides electronic connections between cathode catalyst sites 134 and first current collector 120. In some examples, cathode conductive layer 136 extends to and contacts first current collector 120. Referring to FIG. 3A, in some examples, internal cathode porous base surface 133 contacts first current collector 120. For example, cathode conductive layer 136 can be introduced after the interface between first current collector 120 and cathode porous base 132 is formed.

Referring to FIG. 3B, in some examples, cathode conductive layer 136 is disposed between and contacts cathode porous base 132 and first current collector 120. In these examples, cathode porous base 132 is spaced away from first current collector 120. In other words, cathode layer 130 is in a form of a stack comprising cathode conductive layer 136 and cathode porous base 132, which are provided as two separate layers. Cathode porous base 132 has internal cathode porous base surface 133 supporting cathode catalyst sites 134. In specific examples, cathode catalyst sites 134 directly interface internal cathode porous base surface 133. Referring to FIG. 3B, in some examples, the porosity of cathode conductive layer 136 is from 20% to 60% or, more specifically from 30% to 50%. In the same or other examples, the thickness of cathode conductive layer 136 is from 0.1 micrometers to 10 micrometers or, more specifically from 0.5 micrometers to 5 micrometers. The conductivity of cathode conductive layer 136 is greater than 0.1 S/cm or, more specifically, greater than 1 S/cm. It should be noted that in these examples cathode conductive layer 136 is responsible for transporting the oxidant to cathode catalyst sites 134 provided within cathode porous base 132.

Referring to FIG. 3C, in some examples, cathode conductive layer 136 comprises first cathode conductive layer portion 137 and second cathode conductive layer portion 138. First cathode conductive layer portion 137 is disposed between and contacts cathode porous base 132 and first current collector 120. As such, cathode porous base 132 is spaced away from first current collector 120 by first cathode conductive layer portion 137. Various aspects of first cathode conductive layer portion 137 are described above with reference to FIG. 3B. Second cathode conductive layer portion 138 of is disposed on internal cathode porous base surface 133 and defines cathode pores 139 of cathode layer 130. Various aspects of second cathode conductive layer portion 138 are described above with reference to FIG. 3A.

Referring to FIG. 3C, in some examples, cathode conductive layer portion 137 is formed from lanthanum chromite (LaCrO$_3$), strontium titanate (SrTiO$_3$), 430 stainless steel alloy, 434 stainless steel alloy, and/or doped versions thereof.

Figure 3D:
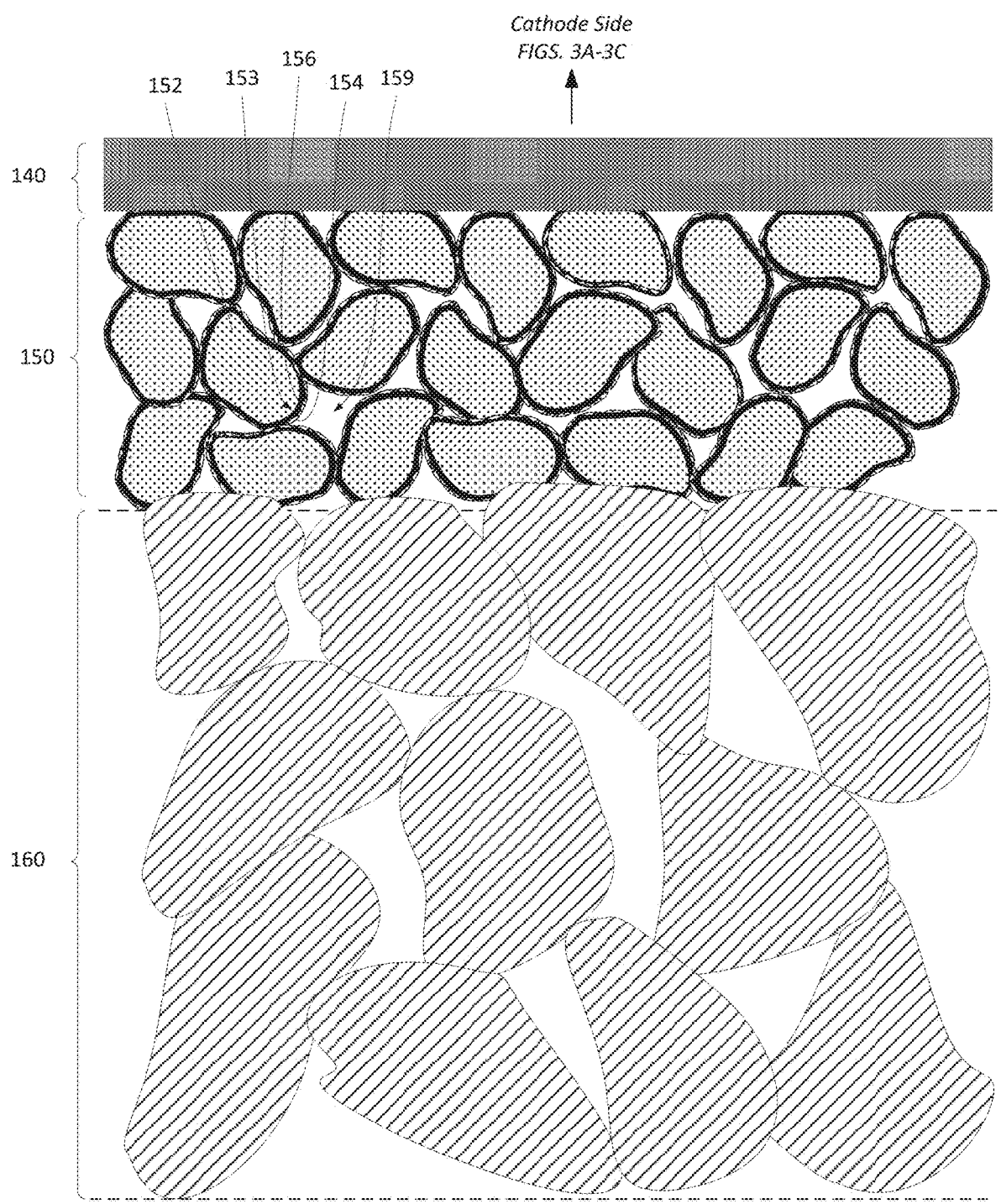
FIG. 3D is a schematic representation of the anode side of a unit cell, illustrating electronic pathways within the anode layer provided, at least in part by an anode conductive layer.

While FIGS. 3A-3C illustrate various examples of cathode conductive layer 136, anode conductive layer 156 can be positioned in similar manners as will now be described with reference to FIGS. 3D-3F. FIG. 3D is a schematic representation of the anode cell side, in accordance with some examples. Specifically, FIG. 3D illustrates second current collector 160, electrolyte layer 140, and anode layer 150 disposed between second current collector 160 and electrolyte layer 140. As noted above, anode layer 150 comprises anode porous base 152, anode catalyst sites 154, and anode conductive layer 156. Anode porous base 152 comprises internal anode porous base surface 153. Referring to the example in FIG. 3D, anode conductive layer 156 (shown as a thick black line) is disposed on internal anode porous base surface 153. In some examples, anode conductive layer 156 defines anode pores 159 of anode layer 150. Anode catalyst sites 154 are disposed over anode conductive layer 156, e.g., within anode pores 159. In other words, anode conductive layer 156 at least partially separates anode porous base 152 from anode catalyst sites 154. In some examples, anode conductive layer 156 fully separates anode porous base 152 from anode catalyst sites 154. This separation helps to prevent interaction between anode porous base 152 and anode catalyst sites 154, which may otherwise negatively impact the performance of anode catalyst sites 154. Furthermore, anode conductive layer 156 provides electronic connections between anode catalyst sites 154 and second current collector 160. In some examples, anode conductive layer 156 extends to and contacts second current collector 160. Referring to FIG. 3D, in some examples, internal anode porous base surface 153 contacts second current collector 160. For example, anode conductive layer 156 can be introduced after the interface between second current collector 160 and anode porous base 152 is formed.

Figure 3E:
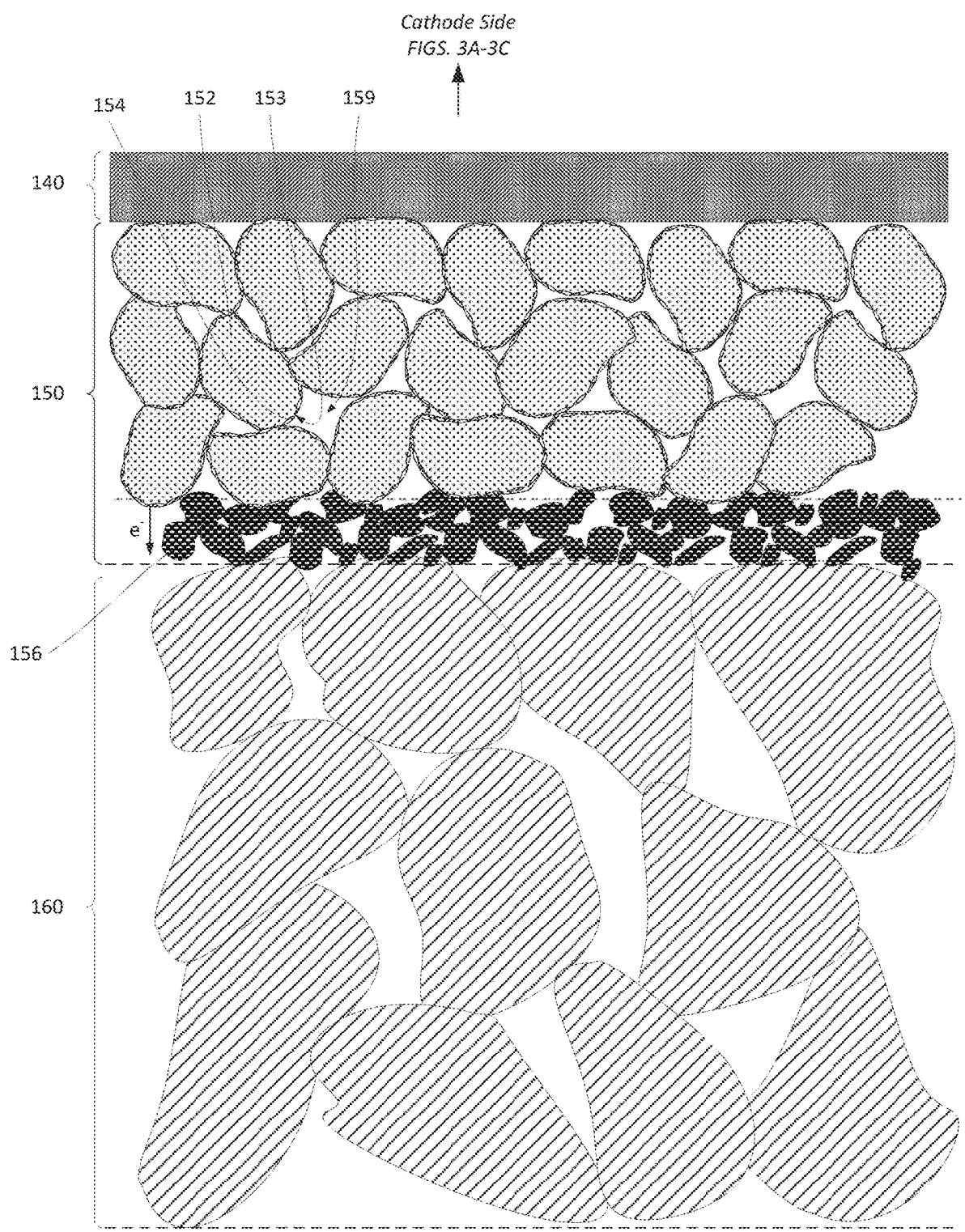
FIG. 3E is a schematic representation of the anode side of a unit cell, illustrating electronic pathways between the anode layer and the current collector provided, at least in part by an anode conductive layer.

Referring to FIG. 3E, in some examples, anode conductive layer 156 is disposed between and contacts anode porous base 152 and second current collector 160. In these examples, anode porous base 152 is spaced away from second current collector 160. In other words, anode layer 150 is in a form of a stack comprising anode conductive layer 156 and anode porous base 152, which are provided as two separate layers. Anode porous base 152 has internal anode porous base surface 153 supporting anode catalyst sites 154. In specific examples, anode catalyst sites 154 directly interface internal anode porous base surface 153. Referring to FIG. 3E, in some examples, the porosity of anode conductive layer 156 is from 20% to 60% or, more specifically from 30% to 50%. In the same or other examples, the thickness of anode conductive layer 156 is from 0.1 micrometers to 10 micrometers or, more specifically from 0.5 micrometers to 5 micrometers. The conductivity of anode conductive layer 156 is greater than 0.1 S/cm or, more specifically, greater than 1 S/cm. It should be noted that in these examples anode conductive layer 156 is responsible for transporting the oxidant to anode catalyst sites 154 provided within anode porous base 152.

Figure 3F:
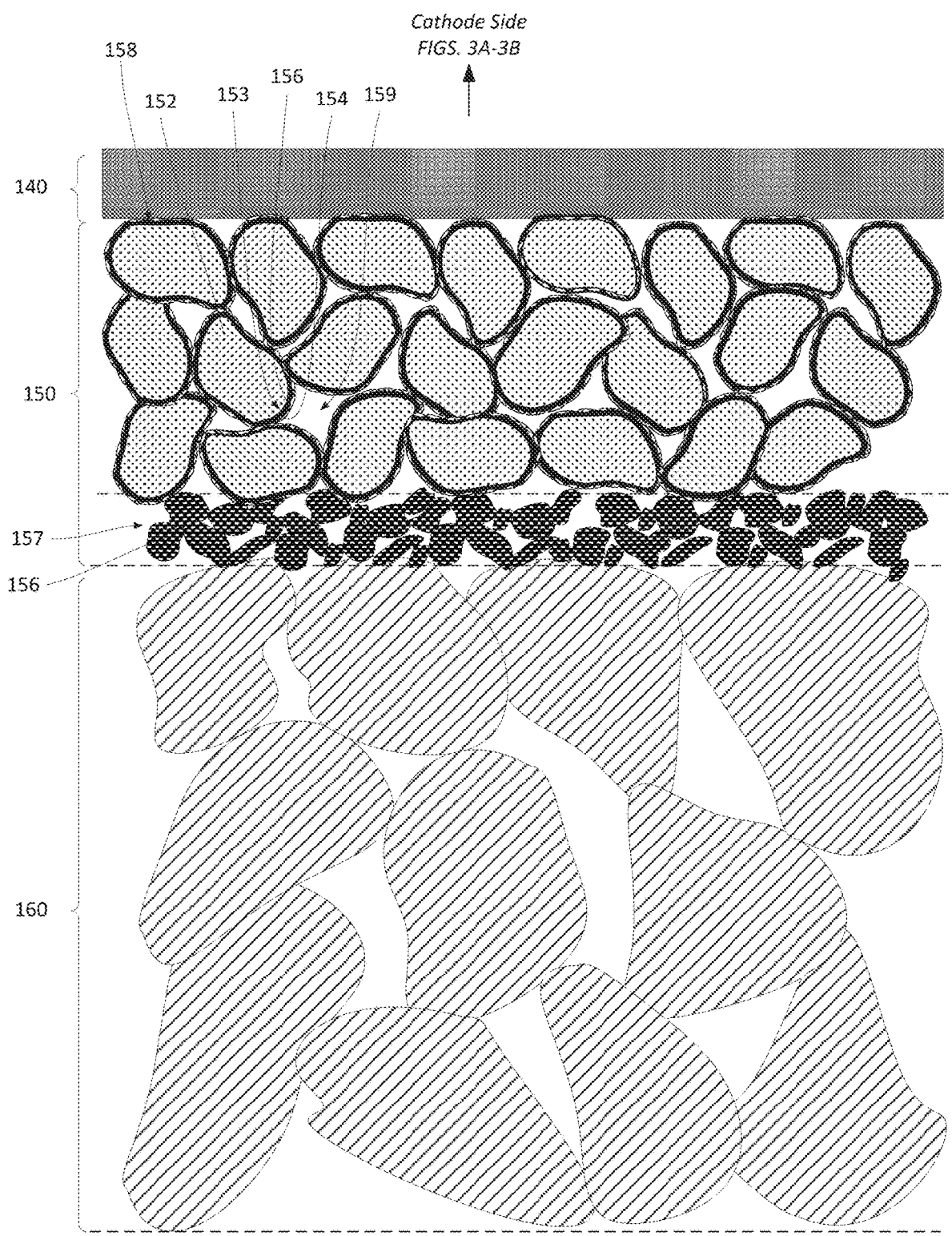
FIG. 3F is a schematic representation of the anode side of a unit cell, illustrating electronic pathways within the anode layer and between the anode layer and the current collector provided, at least in part by an anode conductive layer.

Referring to FIG. 3F, in some examples, anode conductive layer 156 comprises first anode conductive layer portion 157 and second anode conductive layer portion 158. First anode conductive layer portion 157 is disposed between and contacts anode porous base 152 and second current collector 160. As such, anode porous base 152 is spaced away from second current collector 160 by first anode conductive layer portion 157. Various aspects of first anode conductive layer portion 157 are described above with reference to FIG. 3B. Second anode conductive layer portion 158 of is disposed on internal anode porous base surface 153 and defines anode pores 159 of anode layer 150. Various aspects of second anode conductive layer portion 158 are described above with reference to FIG. 3D. Referring to FIG. 3C, in some examples, anode conductive layer portion 157 is formed from lanthanum chromite ($LaCrO_3$), strontium titanate ($SrTiO_3$), 430 stainless steel alloy, 434 stainless steel alloy, and the like.

Examples of Forming Solid Oxide Fuel Cells

Figure 4:
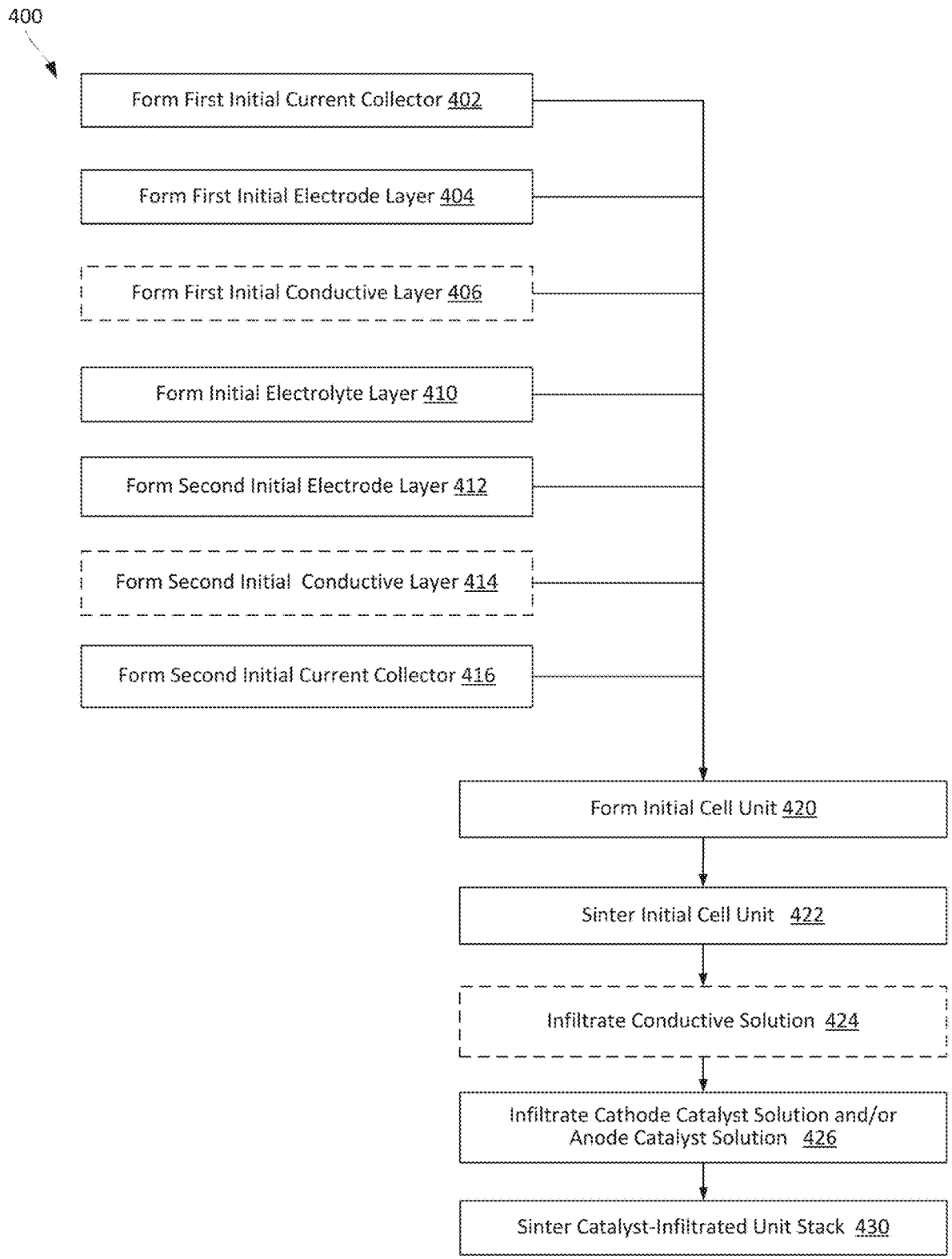
FIG. 4 is a process flowchart corresponding to various examples of a method of forming solid oxide fuel cells.

FIG. 4 is a process flowchart corresponding to various examples of method 400 of forming solid oxide fuel cell 100, in accordance with some examples. Various examples of solid oxide fuel cell 100 are described above with reference to FIGS. 1A-3F.

Method 400 comprises forming (block 420) initial unit cell 510, comprising first initial current collector 520, first initial electrode layer 530, initial electrolyte layer 540, second initial electrode layer 550, and second initial current collector 560 as, e.g., is schematically shown in FIG. 5A. For example, initial electrolyte layer 540 is disposed between and directly interfaces first initial electrode layer 530 and second initial electrode layer 550. In some examples, first initial electrode layer 530 is disposed between and directly interfaces first initial current collector 520 and initial electrolyte layer 540. In the same or other examples, second initial electrode layer 550 is disposed between and directly interfaces second initial current collector 560 and initial electrolyte layer 540.

Referring to FIG. 5A, in some examples, initial unit cell 510 comprises first initial conducting layer 536 and/or second initial conducting layer 556. It should be noted that initial conducting layer 536 and second initial conducting layer 556 are optional layers and one or both of these layers may not be present in some examples. When present, first initial conducting layer 536 is disposed between and directly interfaces first initial electrode layer 530 and first initial current collector 520. Similarly, when present, second initial conducting layer 556 is disposed between and directly interfaces second initial electrode layer 550 and second initial current collector 560. Overall, initial unit cell 510 is formed by stacking corresponding layers over each other. Each one of these layers will now be described in more detail.

In some examples, method 400 comprises forming (block 402) first initial current collector 520. For example, a metal powder comprising particles formed from 430 stainless steel alloy, 434 stainless steel alloy, and/or Fe—Cr alloys (e.g., with various additives) can be arranged to form first initial current collector 520. The particle size can range from 20 micrometers to 100 micrometers or, more specifically, from 30 micrometers to 60 micrometers. The thickness of first initial current collector 520 can be from 50 micrometers to 500 micrometers or, more specifically, from 80 micrometers to 400 micrometers. In some examples, first initial current collector 520 comprises a pore-forming agent. In some examples, first initial current collector 520 comprise a sintering-control agent, such as doped zirconia ($X:ZrO_2$, where X represents yttrium (Y), scandium (Sc), cerium (Ce), and/or calcium (Ca)), alumina ($Al_2O_3$), yttria ($Y_2O_3$), calcium oxide (CaO), magnesium oxide (MgO). The amount of sintering-control agent can be between 0.1% by weight and 5% by weight or, more specifically, between 0.5% by weight and 2.5% by weight. The sintering-control agent helps to achieve finer metal grains, smaller pores, more uniform pore distribution, higher porosity. Overall, adding the sintering-control agent helps achieve higher flow rates of fuel, oxidant, and reaction products through the current collectors.

In some examples, method 400 comprises forming (block 404) first initial electrode layer 530. For example, a ceramic powder comprising particles formed from ZrO and/or CeO can be arranged to form first initial electrode layer 530. In some examples, the ceramic powder is doped with one or more of Sm, Y, Sc, Gd, Al, and/or La. The particle size can range from 0.1 micrometers and 2 micrometers or, more specifically, from 0.5 micrometers to 1 micrometers. The thickness of first initial electrode layer 530 can be from 10 micrometers to 50 micrometers or, more specifically, from 15 micrometers to 40 micrometers. In some examples, first initial electrode layer 530 comprises a pore-forming agent. First initial electrode layer 530 later forms cathode porous base 132 of unit cell 110.

In some examples, method 400 comprises forming (block 406) first initial conducting layer 536. For example, a powder comprises particles formed from $CeO_2$, $LaCrO_3$, $SrTiO_3$, 430 stainless steel alloy, 434 stainless steel alloy, and/or Fe—Cr alloys can be arranged to form first initial conducting layer 536. In some examples, these particles can be doped with one or more of with one or more strontium (Sr), aluminium (Al), cobalt (Co), samarium (Sm), gadolinium (Gd), lanthanum (La), calcium (Ca), yttrium (Y), and/or zirconium (Zr). In some examples, these discrete particles have a size from 10 nanometers to 1 micrometer or, more specifically, from 50 nanometers to 500 nanometers. The thickness of first initial conducting layer 536 can be from 5 micrometers to 30 micrometers or, more specifically, from 7 micrometers to 25 micrometers. In some examples, first initial conducting layer 536 comprises a pore former in an amount of up 50% by weight or, more specifically, from 20 to 40% by weight. One example of suitable pore formers includes, but is not limited to, polymethyl methacrylate (PMMA). It should be noted that first initial conducting layer 536 is optional and is used to form structures illustrated in FIGS. 3B and 3C. When forming a structure illustrated in FIG. 3A this operation is not performed.

In some examples, method 400 comprises forming (block 410) initial electrolyte layer 540. For example, a ceramic powder comprising particles formed from ZrO and/or CeO can be arranged to form initial electrolyte layer 540. In some examples, the ceramic powder is doped with one or more of Sm, Y, Sc, Gd, Al, and/or La. The particle size can range 0.1 micrometers to 2 micrometers or, more specifically, from 0.5 micrometers to 1 micrometer. The thickness of initial electrolyte layer 540 can be from 1 micrometer to 30 micrometers or, more specifically, from 2 micrometers to 20 micrometers. Initial electrolyte layer 540 is used to form electrolyte layer 140, which can be a non-porous structure (e.g., having a porosity of less than 5% or even less than 1%)

In some examples, method 400 comprises forming (block 412) second initial electrode layer 550, which can be performed in a manner similar to forming (block 404) first initial electrode layer 530. In some examples, method 400 comprises forming (block 414) second initial conducting layer 556, which can be performed in a manner similar to forming (block 406) first initial conducting layer 536. It should be noted that second initial conducting layer 556 is optional and is used to form structures illustrated in FIGS. 3E and 3F. When forming a structure illustrated in FIG. 3D this operation is not performed. Finally, in some examples, method 400 comprises forming (block 416) second initial current collector 560, which can be performed in a manner similar to forming (block 402) first initial current collector 520.

Method 400 proceeds with sintering (block 422) initial unit cell 510 thereby forming pre-catalyzed unit cell 512. For example, this operation is performed at a temperature from 1300° C. to 1400° C. in a reducing atmosphere (e.g., 4% $H_2$ in Ar). During this operation, corresponding layers in initial unit cell 510 are debinded in air. Furthermore, discrete particles in these layers are fused together into porous structures.

One example of pre-catalyzed unit cell 512 is shown in FIG. 5B. For example, first initial current collector 520 is converted into first current collector 120. First initial electrode layer 530 and, if present, first initial conducting layer 536 are converted into first sintered electrode layer 535. Unlike cathode layer 130 in the final unit cell 110, first sintered electrode layer 535 does not yet have any catalyst. It should be noted that at this stage first sintered electrode layer 535 can be processed into cathode layer 130 or anode layer 150 when initial unit cell 510 is a symmetrical structure. For example, first sintered electrode layer 535 can be processed into cathode layer 130, while second sintered electrode layer 555 can be processed into anode layer 150. This example is focused on below. Alternatively, first sintered electrode layer 535 can be processed into anode layer 150, while second sintered electrode layer 535 can be processed into cathode layer 130. One having ordinary skill in the art would understand how to apply the following description to this alternative example as well.

Referring to the example when first initial conducting layer 536 is present in initial unit cell 510, both first initial conducting layer 536 and first initial electrode layer 530 are converted into first sintered electrode layer 533. Referring to the final cell components, first initial electrode layer 530 is converted to cathode porous base 132 while first initial conducting layer 536 is converted into cathode conductive layer portion 137. Similarly, when second initial conducting layer 556 is present in initial unit cell 510, both second initial conducting layer 556 and second initial electrode layer 550 are converted into second sintered electrode layer 553. Referring to the final cell components, second initial electrode layer 550 is converted to anode porous base 152 while second initial conducting layer 556 is converted into anode conductive layer portion 157. It should be noted that, in some examples, only one of first initial conducting layer 536 and second initial conducting layer 556 is present. Furthermore, in some examples, neither one of first initial conducting layer 536 and second initial conducting layer 556 is present. Finally, initial electrolyte layer 540 is converted into electrolyte layer 140.

In some examples, method 400 further comprises infiltrating (block 424) a conductive solution into pre-catalyzed unit cell 512 thereby forming pre-catalyzed conductive stack 513 shown in FIG. 5C. Adding of the conductive solution converts first sintered electrode layer 533 into first modified electrode layer 534. In a similar manner, adding the conductive solution converts second sintered electrode layer 553 into second modified electrode layer 554. Other layers (e.g., first current collector 120, electrolyte layer 140, and second current collector 160) may remain intact.

For example, the conductive solution comprises cerium nitrates and, in some examples, one or more doping materials (e.g., samarium (Sm), gadolinium (Gd), lanthanum (La), calcium (Ca), yttrium (Y), and/or zirconium (Zr)) can be used during this infiltration operation. For example, a nitrate of a corresponding material is dissolved in water and mixed with ethylene glycol to prepare the conductive solution. This operation is performed before infiltrating a cathode catalyst solution and an anode catalyst solution. In some example, the conductive solution is infiltrated into both first sintered electrode layer 535 and second sintered electrode layer 555. In a later sintering operation, the cathode catalyst solution or, more specifically, temporary layers formed from this solution are converted into at least a portion of cathode conductive layer 136 and a portion of anode conductive layer 156. It should be noted that this conductive solution infiltration operation is an optional operation. In some examples, method 400 proceeds from the initial sintering directly to the catalyst infiltration. In these examples, cathode conductive layer 136 is formed from first initial electrode conducting layer 536, while anode conductive layer 156 is formed from second initial electrode conducting layer 556.

Method 400 proceeds with infiltrating (block 426) a cathode catalyst solution and an anode catalyst solution into a pre-catalyzed unit cell 512. A catalyst-infiltrated unit cell 514 is formed during this operation and is schematically shown in FIG. 5D. Specifically, the cathode catalyst solution forms a temporary layer in cathode porous base 132, while the anode catalyst solution forms another temporary layer in anode porous base 152. After infiltration, the cell is dried in 90° C. and then sintered at 500-850° C. to form nanocrystalline catalysts. This operation can be repeated until the desired catalyst loading is achieved.

Method 400 proceeds with sintering (block 430) catalyst-infiltrated unit cell 514 thereby forming unit cell 110, which is schematically shown in FIG. 5E. In some examples, multiple unit cells 110 are processed simultaneously, forming solid oxide fuel cell 100. Various examples of solid oxide fuel cell 100 and unit cells 110 are described above with reference to FIGS. 1A-3F.

Experimental Results

Various tests have been conducted to determine the performance of solid oxide fuel cells with conductive layers and compare these cells to conventional/reference cells (i.e., solid oxide fuel cells without conductive layers). Specifically, a reference cell was fabricated with anode and cathode catalyst loadings of 10 mg/cm$^2$ and no conductive layers present in the cell. A test cell was fabricated with anode and cathode catalyst loading of 11 mg/cm$^2$ and conductive layers formed using Sm—CeO$_2$ coating having a loading of 5 mg/cm$^2$. Both cells were functionally tested to determine cell potential and power at various operating conditions (e.g., currents).

The results of this test are presented in FIGS. 6A and 6B. Specifically, FIG. 6A corresponds to a reference cell and illustrates power and cell potential curves as a function of the current or, more specifically, as a function of the current density (a current per unit area). The peak power, achieved with this reference cell, was slightly over 0.12 W/cm$^2$. The area-specific resistance (ASR), which is a slope of the potential curve, was estimated at 2.69 Ohm*cm$^2$.

FIG. 6B corresponds to a test cell and also illustrates the power and potential curves as a function of the current/current density. The peak power, achieved with this test cell, was slightly over 0.24 W/cm$^2$, or almost double that for the reference cell. The ASR was estimated at 1.40 Ohm*cm$^2$, or almost half of the reference cell value. Overall, these test results illustrate a substantial improvement of the test cell (with a conductive coating) over the reference cell (without any conductive coating).

Another set of experiments was conducted to test the effects of sintering-control additives on fuel cells or, more specifically, on the structure and performance of current collectors. FIG. 7A is a scanning electron microscope (SEM) image of a unit cell manufactured without a sintering-control additive, which may be referred to as a reference cell. The current collectors of this reference cell were formed from stainless steel without any sinter-control additives. FIG. 7B is a magnified portion of the SEM image in FIG. 7A. FIG. 7C is an SEM image of a unit cell manufactured with 1% by weight of zirconia (as a sintering-control additive) added to the stainless steel powder before sintering the current collectors. FIG. 7D is a magnified portion of the SEM image in FIG. 7C. These current collectors with the sintering-control additive experience much smaller shrinkage in the Z-direction (during the sintering) relative to the current collectors without any sintering-control additives, i.e., 7% vs. 15-20%. The X-Y shrinkage was about the same and was estimated at about 19%. As a result of this sintering control and lower shrinkage, the current collectors with the sintering-control additive demonstrate finer stainless steel grains and smaller pores (in comparison to the current collectors without any sintering-control additives). Furthermore, the current collectors with the sintering-control additive demonstrate improved interface contacts with the electrode layers.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A solid oxide fuel cell comprising:
   a first current collector;
   a second current collector;
   an electrolyte layer;
   a cathode layer, comprising a cathode porous base, cathode catalyst sites, and a cathode conductive layer, wherein:
     the cathode layer is disposed between and in contact with the first current collector and the electrolyte layer,
     the cathode conductive layer provides electrical conduction between the first current collector and the cathode catalyst sites,
     the cathode conductive layer comprises a first cathode conductive layer portion and a second cathode conductive layer portion,
     the first cathode conductive layer portion is disposed between and contacts the cathode porous base and first current collector,
     the first cathode conductive layer portion has a conductivity greater than 0.1 S/cm,
     the cathode catalyst sites are disposed over the second cathode conductive layer portion such that the second cathode conductive layer portion is positioned between the cathode porous base and the cathode catalyst sites and prevents interaction between the cathode porous base and the cathode catalyst sites, and
     the cathode conductive layer comprises 430 stainless steel alloy, 434 stainless steel alloy, or a Fe—Cr alloy; and
   an anode layer, comprising an anode porous base, anode catalyst sites, and an anode conductive layer, wherein:
     the anode layer is disposed between and in contact with the second current collector and the electrolyte layer,
     the anode conductive layer provides electrical conduction between the second current collector and the anode catalyst sites,
     the anode conductive layer comprises Sm-doped $CeO_2$, and
     the anode catalyst sites are disposed over the anode conductive layer such that the anode conductive layer is positioned between the anode porous base and the anode catalyst sites.

2. The solid oxide fuel cell of claim 1, wherein:
   the anode porous base comprises an internal anode porous base surface,
   the anode conductive layer is disposed on the internal anode porous base surface and defines anode pores of the anode layer, and
   the anode catalyst sites are disposed over the anode conductive layer.

3. The solid oxide fuel cell of claim 2, wherein the anode conductive layer extends to and contacts the second current collector.

4. The solid oxide fuel cell of claim 3, wherein the internal anode porous base surface contacts the second current collector.

5. The solid oxide fuel cell of claim 2, wherein:
   the anode conductive layer comprises a first anode conductive layer portion and a second anode conductive layer portion,
   the first anode conductive layer portion is disposed between and contacts the anode porous base and the second current collector such that the anode porous base is spaced away from the second current collector, and
   the second anode conductive layer portion is disposed on the internal anode porous base surface and defines the anode pores of the anode layer.

6. The solid oxide fuel cell of claim 1, wherein the anode conductive layer is disposed between and contacts the anode porous base and the second current collector such that the anode porous base is spaced away from the second current collector.

7. The solid oxide fuel cell of claim 6, wherein the cathode conductive layer is disposed between and contacts the cathode porous base and the first current collector such that the cathode porous base is spaced away from the first current collector.

8. The solid oxide fuel cell of claim 6, wherein the anode conductive layer has a thickness of 1 micrometer to 20 micrometers.

9. The solid oxide fuel cell of claim 1, wherein at least one of the first current collector or the second current collector comprises a sintering-control agent, selected from the group consisting of doped zirconia (X—$ZrO_2$ with X representing one or more of yttrium (Y), scandium (Sc), cerium (Ce), calcium (Ca)), alumina ($Al_2O_3$), yttria ($Y_2O_3$), calcium oxide (CaO), and magnesium oxide (MgO).

10. The solid oxide fuel cell of claim 9, wherein the sintering-control agent in at least one of the first current collector or the second current collector of between 0.1% by weight and 5% by weight.

11. The solid oxide fuel cell of claim 1, wherein the cathode porous base has a thickness from 5 micrometers to 40 micrometers.

12. The solid oxide fuel cell of claim 1, wherein the cathode porous base has a porosity between 20% and 60%.

13. The solid oxide fuel cell of claim 1, wherein the cathode catalyst sites comprise at least one of a lanthanum strontium manganite ($La_{1-x}Sr_xMnO_3$), a praseodymium oxide, a lanthanum strontium cobalt ferrite ($La_xSr_{1-x}Co_yFe_{1-y}O_3$), or lanthanum strontium cobaltite ($LaSrCoO_3$).

14. The solid oxide fuel cell of claim 1, wherein the anode catalyst sites comprise nickel.

15. The solid oxide fuel cell of claim 1, wherein:
the cathode porous base comprises an internal cathode porous base surface,
the cathode conductive layer is disposed on the internal cathode porous base surface and defines cathode pores of the cathode layer, and
the cathode catalyst sites are disposed over the cathode conductive layer.

16. The solid oxide fuel cell of claim 15, wherein the cathode conductive layer extends to and contacts the first current collector.

17. The solid oxide fuel cell of claim 16, wherein the internal cathode porous base surface contacts the first current collector.

18. The solid oxide fuel cell of claim 1, wherein:
the second cathode conductive layer portion is disposed on the internal cathode porous base surface and defines the cathode pores of the cathode layer.

19. The solid oxide fuel cell of claim 1, wherein the first cathode conductive layer portion has a conductivity greater than 1 S/cm.

* * * * *